United States Patent

Hodges

[15] 3,678,232
[45] July 18, 1972

[54] LIQUID RESERVOIRS

[72] Inventor: Peter Kinson Hodges, Solihull, England
[73] Assignee: Girling Limited, Birmingham, England
[22] Filed: Dec. 23, 1970
[21] Appl. No.: 101,081

[30] Foreign Application Priority Data

Jan. 10, 1970 Great Britain.........................1,319/70
March 10, 1970 Great Britain.....................11,409/70

[52] U.S. Cl. .........................................................200/84 C
[51] Int. Cl. .......................................................H01h 35/18
[58] Field of Search....................73/311, 308, 313; 200/84 C, 200/84 R, 82 D; 335/207

[56] References Cited

UNITED STATES PATENTS

| | | | |
|---|---|---|---|
| 3,342,960 | 9/1967 | Dillon et al............................ | 200/84 C |
| 3,560,918 | 2/1971 | Lewis et al............................ | 200/82 D |
| 3,576,959 | 5/1971 | Bogosoff.............................. | 200/84 C |

*Primary Examiner*—David Smith, Jr.
*Attorney*—Holman & Stern

[57] ABSTRACT

A liquid reservoir for use with a tandem master cylinder of a vehicle hydraulic system includes a dividing wall which serves to define a pair of chembers, the diving wall also defines in the chambers respectively guideways which guide the vertical movement of float assemblies. Each float assembly includes a magnet operable to close a pair of contacts in a switch housed in the dividing wall when the liquid level in the respective chamber falls below a predetermined level.

7 Claims, 4 Drawing Figures

INVENTOR
Peter Kinson Hodges

ATTORNEYS

LIQUID RESERVOIRS

This invention relates to a liquid reservoir for use with a tandem master cylinder of a vehicle hydraulic system, the reservoir defining a pair of isilated chambers and the object of the invention is to provide in such a reservoir means whereby a warning of a low level of liquid in one or both chambers may be given.

According to the invention a liquid reservoir of the kind specified comprises a dividing wall serving to isolate the pair of chambers, a pair of float members located in the chambers respectively and a pair of magnets carried by said float members respectively, and switch means operable by the magnetic field produced by the magnets, each magnet acting to operate said switch means when the level of liquid is in its associated chamber falls to a predetermined level.

Figure 1:
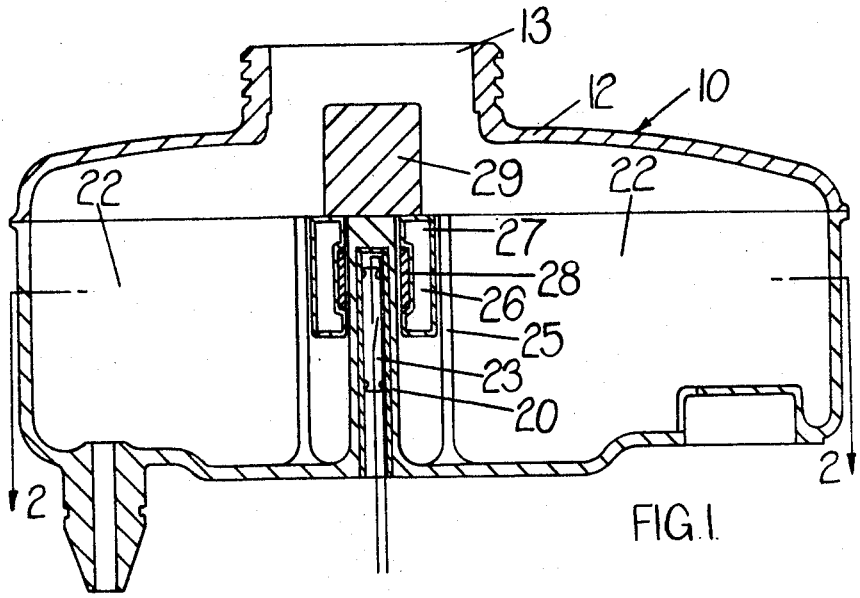
Figure 2:
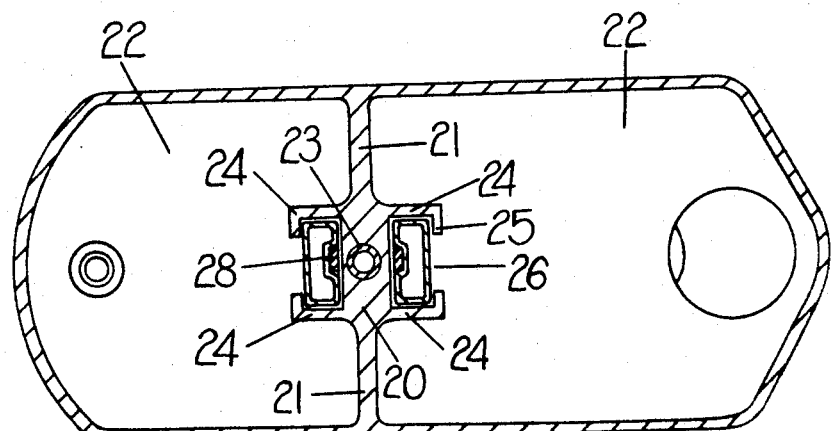
Figure 3:
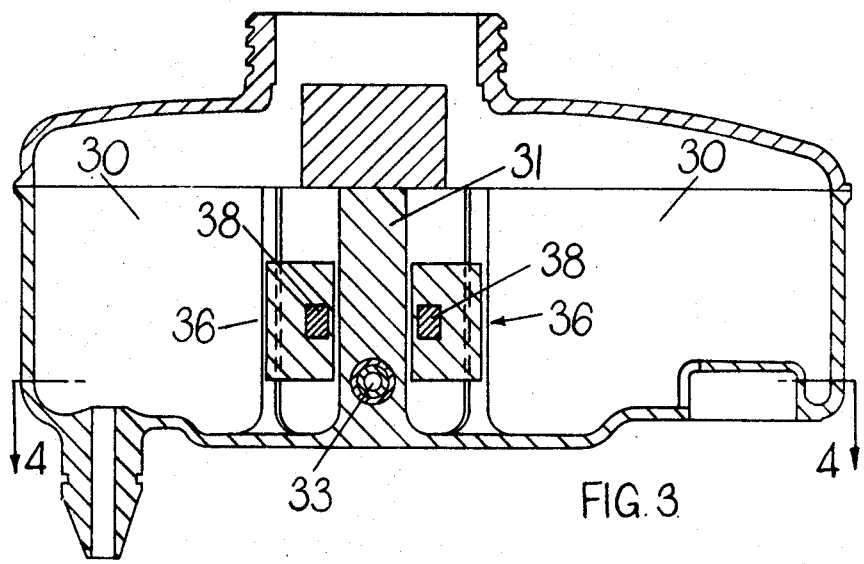
Figure 4:
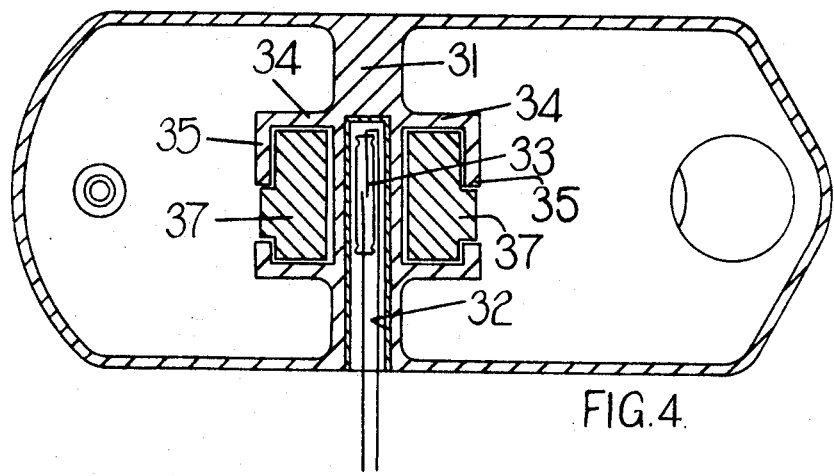

In the accompanying drawings:

FIG. 1 is a sectional side elevation of one example of a reservoir in accordance with the invention, FIG. 2 is a sectional plan view on the line 2—2 of FIG. 1, FIG. 3 is a view similar to FIG. 1 showing another example of a reservoir, and FIG. 4 is a sectional plan view taken on the line 4—4 of FIG. 3.

With reference to FIGS. 1 and 2 there is shown a fluid reservoir 10 defining a pair of chambers 22 disposed in side by side relationship. The reservoir includes a dividing wall 21 and a top portion 12 which is provided with an opening 13 through which liquid can be poured into the chambers.

Intermediate its ends the dividing wall 21 defines a thickened portion 20 and within this portion and extending upwardly from the base of the reservoir is a bore. Within the bore is mounted a switch means in the form of an electrical reed switch 23. The reed switch includes a pair of contacts.

Moreover, extending on each side of the dividing wall 21 is a pair of spaced flanges 24 and each flange is provided with a lip 25. The lips together with the flanges 24 and the wall of the thickened portion 20 of the dividing wall define a pair of guideways opening into the chambers 22 respectively.

Located within the guideways respectively are a pair of float assemblies 26. Each float assembly includes a float 27 to which is secured a permanent magnet 28. The arrangement is such that if the liquid level in either of the chambers falls to or below a predetermined level, the reed switch will be operated by the respective magnet. The top 12 of the reservoir includes a baffle 29 which co-operates with the dividing wall 21 and limits the upward movement of the float assemblies.

Conveniently the reservoirs and the tops of both examples are formed from synthetic resin material and the parts constituting the guideways are moulded integrally. The reed switch can be potted in the spigot portions.

With reference now to FIGS. 3 and 4, the dividing wall 31 is of substantial thickness and divides the reservoir into a pair of chambers 30. As in the previous example pair of flanges 34 are provided on opposite sides of the dividing wall and each flange is provided with a lip 35. The float assemblies 36 are guided by the guideways for vertical movement and each float assembly includes a permanent magnet 38. Near the lower end of the dividing wall there is provided a horizontal blind bore 32 in which is located a reed switch 33, and as in the previous example when the liquid level in either one or both chambers falls to or below a predetermined level, the contacts of the reed switch will be operated.

In the first example the magnets are polarized in the vertical direction and in the second example the magnets are polarized in the horizontal direction. The latter construction i.e. in which the magnetic field is at right angles to the direction of movement of the float assemblies, is the preferred construction since the interaction of the magnetic fields produced by themagnets is at a minimum. It will be understood that the reed switch may be inclined at any position between the vertical and horizontal positions.

I claim:

1. A liquid reservoir for use with a tandem master cylinder of a vehicle hydraulic system, the reservoir defining a pair of isolated chambers, the reservoir comprising in combination a dividing wall serving to isolate the pair of chambers from each other, a pair of float members located in the chambers respectively, a pair of magnets carried by said float members respectively and a single switch means operable by the magnetic field produced by the magnets, each magnet acting to operate said switch when the liquid level in its associated chamber falls to a predetermined level.

2. A liquid reservoir for use with a tandem master cylinder of a vehicle hudraulic system, the reservoir defining a pair of isolated chambers, the reservoir comprising in combination a dividing wall serving to isolate the pair of chambers from each other, a pair of float members located in the chambers respectively, a pair of magnets carried by said float members respectively and a single switch located within said dividing wall and operable by the magnetic field produced by the magnets, each magnet acting to operate said switch when the liquid level in its associated chamber falls to a predetermined level.

3. A liquid reservoir as claimed in claim 2 including guideways for guiding the movement of said float members.

4. A liquid reservoir as claimed in claim 3 in which each guideway comprises a pair of spaced flanges having inturned lips, said flanges and lips being formed integrally with said dividing wall.

5. A liquid reservoir as claimed in claim 4 in which said switch means comprises an electrical reed switch.

6. A liquid reservoir as claimed in claim 5 in which said magnets are polarized in a direction substantially at right angles to the direction of movement of the floats.

7. A liquid reservoir as claimed in claim 6 in which the reservoir is provided with a top, the top including a baffle which co-operates with the dividing wall and limits the upward movement of the floats.

* * * * *